United States Patent [19]

Couche

[11] Patent Number: 4,561,980

[45] Date of Patent: Dec. 31, 1985

[54] SCREENING DEVICE

[75] Inventor: Raymond A. Couche, Dalkeith, Australia

[73] Assignee: R. A. Couche & Associates Pty. Ltd., Dalkeith, Australia

[21] Appl. No.: 638,760

[22] Filed: Aug. 8, 1984

[30] Foreign Application Priority Data

Aug. 8, 1983 [AU] Australia .............................. PG0709

[51] Int. Cl.⁴ .............................................. B01D 39/00
[52] U.S. Cl. .................................... 210/486; 210/499; 209/170; 209/306
[58] Field of Search ....................... 209/170, 305, 306; 210/331, 486, 487, 499

[56] References Cited

U.S. PATENT DOCUMENTS

| | | | |
|---|---|---|---|
| 2,374,756 | 5/1945 | Kisch et al. | 210/499 |
| 3,085,690 | 4/1963 | May | 210/499 |
| 3,428,175 | 2/1969 | Hukki | 209/168 |

FOREIGN PATENT DOCUMENTS

| | | | |
|---|---|---|---|
| 0910613 | 5/1954 | Fed. Rep. of Germany | 209/305 |
| 0872715 | 6/1942 | France | 209/170 |
| 2095130 | 9/1982 | United Kingdom | 209/170 |

Primary Examiner—Charles Hart
Attorney, Agent, or Firm—Harness, Dickey & Pierce

[57] ABSTRACT

A screening device for immersion in a vessel containing a pulp or slurry, said device comprising a screening chamber having at least one side wall defined by a screen and closed at the top and bottom said screen being located to be immersed in the pulp or slurry, a discharge pipe located within the screening chamber having an open lower end and positioned close to the bottom and an upper end opening into a discharge outlet external to said vessel said discharge outlet being located below the surface level of the pulp or slurry and above the level of the bottom of the chamber, the capacity of the discharge outlet being such as to maintain a flow rate through the screening chamber and discharge pipe to maintain the solids in the pulp or slurry passing through the screening device in suspension.

18 Claims, 4 Drawing Figures

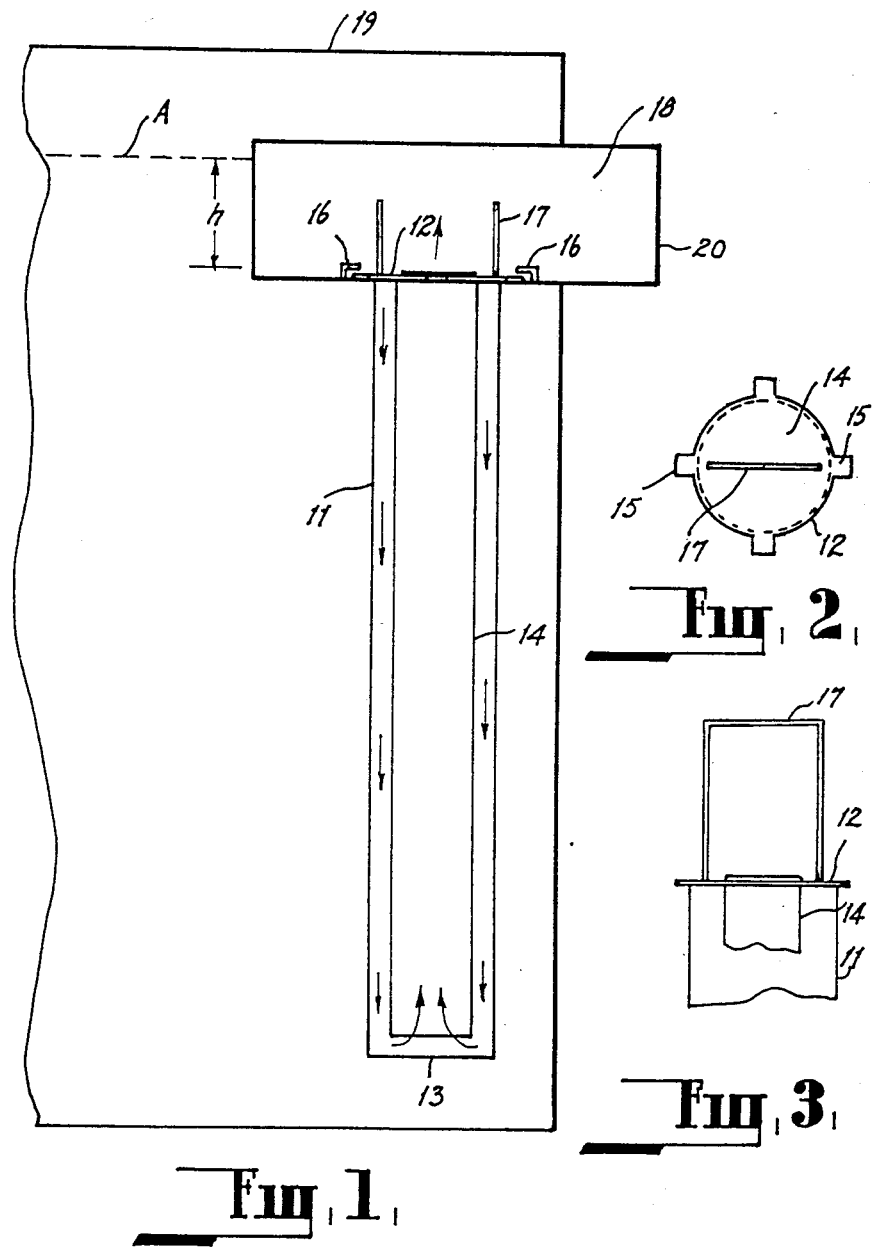

SCREENING DEVICE

This invention relates to an improved screening device.

In many hydrometallugical and other industrial operations there is often a need to screen solids from liquids or classify suspsended solids in liquids, pulps or slurrys.

In the past screening has been done by simply inserting the screen in the flow or by pumping the total material over a vibrating screen or alternatively a DSM wedgebar screen or sieve bend. Such devices have presented the following dificiencies:

1. Screens inserted in the flow in general have a low capacity and rapidly block or "blind";
2. To pass the total flow over an external screen requires the use of a pump to transport the slurry to the screen.

The carbon in pulp (C.I.P.) process for the recovery of gold from solution involves the use of cyanide to dissolve the gold from gold bearing ore whereby the dissolved gold values are subsequently adsorbed onto activated carbon granules which are suspended or freely mixed with the gold ore and cyanide slurry. After a suitable time has been allowed for adsorption the carbon is removed, or alternatively the slurry is allowed to pass through a screen to a subsequent stage. Adequate adsorption generally requires at least four stages of reaction which requires several screen separations of the slurry.

It has been found that open launder screens function reasonably at relatively low flow rates but require constant attention to avoid blocking and to prevent the heavier sands from settling.

It is an object of the present invention to provide a screening device which has a relatively high flow rate and in which the likelihood of sanding and blocking of the screen is reduced.

It is a further object of the invention to provide a screening device which can be readily removed for routine maintenance and replacement without the need for shutting down the operation of the vessel in which the screen is placed.

In one form the invention resides in a screening device for immersion in a vessel containing a pulp or slurry, said device comprising a screening chamber having at least one side wall defined by a screen and closed at the top and bottom said screen being located to be immersed in the pulp or slurry, a discharge pipe located within the screening chamber having an open lower end and positioned close to the bottom and an upper end opening into a discharge outlet external to said vessel said discharge outlet being located below the surface level of the pulp or slurry and above the level of the bottom of the chamber, the capacity of the discharge outlet being such as to maintain a flow rate through the screening chamber and discharge pipe to maintain the solids in the pulp or slurry passing through the screening device in suspension.

According to a preferred feature of the invention said screening chamber is substantially cylindrical, the one wall comprising the cylindrical wall.

According to a further preferred feature of the invention the discharge pipe opens through the top of said screening chamber.

According to a further preferred feature of the invention clearance means is provided for causing a flow of air bubbles over the exterior of the screen.

According to a preferred feature of the previous feature said clearance means comprises a plenum chamber at the bottom of said screening chamber, source of air connected to said plenum chamber and provided with a set of outlets located around the base of the screen.

According to a preferred feature of the invention the device is adapted to be located in a weir to extend downwardly therefrom said weir comprising said discharge outlet.

The invention will be more fully understood in the light of the following descriptions of two specific embodiments. The descriptions are made with reference to the accompanying drawings of which;

FIG. 1 is a fragmentary diagrammatic sectional elevation of one embodiment;

FIG. 2 is a plan view of the screen shown in FIG. 1;

FIG. 3 is a fragmentary sectional elevation showing the fitting of the handle to the screen of FIG. 1.

Figure 4:
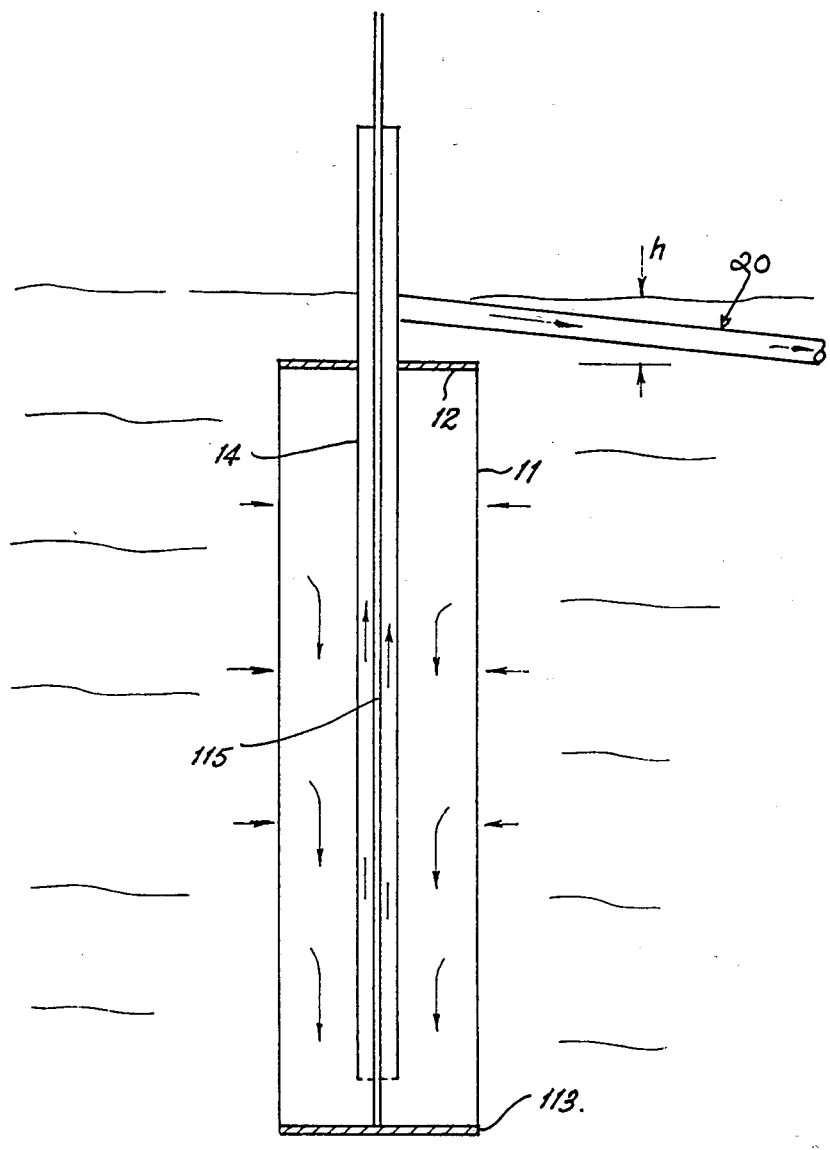
FIG. 4 is a diagrammatic sectional elevation of a second embodiment.

The first embodiment shown at FIGS. 1 to 3 comprises a weir box 18 which is located in a tank 19 containing a slurry or pulp the level of which is maintained at a level below the top of the weir 19 and such that a head "h" is developed between the surface of the slurry and the bottom wall of the weir box 18. The weir box 18 extends beyond the side wall of the tank 19 and at its outermost extremity is formed with an open wall to provide a discharge outlet 20. A screen 11 which is of substantially cylindrical shape in which the cylindrical walls are formed of a suitable mesh or wedgebar, is supported from the bottom of the weir box 18 to depend downwardly therefrom. The bottom of the screen is closed by an imperforate plate 13 while the top of the screen 11 is partially closed by an annular imperforate plate 12 which is fixed to the upper end of the screen 11. The top plate is formed with radially extending lugs at its outer periphery such that when the screen is in position in the weir box 18 the lugs 15 are engaged with complementary flanges 16 formed around the aperture in the base of the weir box 18. The top plate 12 is fitted with handles 17 which facilitate the removal and location of the screen in the base of the weir box 18 and rotation of the screen such that the lugs 15 engage or disengage from the flanges 16. The plate 12 also supports a discharge pipe 14 which extends downwardly from the top plate 12 to a point adjacent the bottom plate 13.

In use the slurry in the tank 19 is caused to flow through the screen walls of the screen 11 to the interior of the screen by virtue of the head "h" provided between the top surface of the slurry A and the upper end of the discharge pipe 14. On the entry of the slurry to the interior of the cylindrical screen it is caused to flow downwardly to the lower end of the discharge pipe 14 through the discharge pipe 14 into the weir box and out of the weir box through the discharge outlet 20. The diameter of the discharge pipe 14 in relation to the head "h" between the surface of the slurry and the bottom of the weir box 18 is sufficient to ensure that the flow rate of material through the interior of the screen and the discharge pipe eliminates sanding or settling of the solids suspended in the slurry at the bottom of the screen 11. This is further facilitated by the relatively close spacing between the lower end of the discharge pipe 14 and the bottom plate 13.

In one example of the embodiment it has been found that satisfactory results can be obtained by using a screen of 300 mm diameter and having the length of 2 m with a screen slot width of 850 microns. The diameter of the discharge pipe was of the order of 75 mm and in use a flow rate of 27 cubic meters per hour or 0.45 cubic meters per minute was produced in a slurry having a density of 50% solids in a carbon in pulp processing plant.

It will be appreciated that in the arrangement described above with the lower end of the discharge pipe closely adjacent the bottom plate of the screen, the static pressure on either side of the screen is substantially constant so that the pressure drop and flow rate through the screen is also substantially constant irrespective of depth.

In addition it will be appreciated that the means of locating the screen in the bottom of the weir box 20 described above need not be limiting on the scope of the invention and that it may be of advantage to provide a locking means which located above the upper end of the screen 11 and above the surface level of the slurry in the weir box 18.

A particular advantage of the screen of the first embodiment relates to the ready installation, removal or replacement of the screen. If the screen is readily removed for routine maintenance or replacement there is not the need to stop the operation of the whole plant to which the tank 19 relates. This contrast to plants utilising launder screens which are fixed to the walls of the vessels and which necessitate the shutting down of the plant or at least the tank to effect repairs.

The second embodiment of the invention as shown at FIG. 4 comprises a screen 11 of the similar configuration to that of the first embodiment except that the screen is supported within the slurry by means other than a weir box. In addition the discharge pipe 14 extends beyond the upper surface of the screen 11 and is provided with a discharge outlet 20 which opens into the discharge pipe 14 substantially at the surface level of the slurry but is inclined downwardly to discharge at a level equal to or lower than the top plate 12 of the screen.

According to a preferred feature of the second embodiment which if desired may also be a feature of the first embodiment a plemun chamber 113 is formed at the bottom of the screen 11 and defines the bottom of the screen. The plenum chamber 113 has an inlet having a pipe 115 connected thereto which extends concentrically through discharge pipe 14 and is connected to a source of compressed air. The outer circular periphery of the plenum chamber 113 is provided with a plurality of valves which may be of any suitable type to allow for air flow from the plenum chamber 113 into the slurry such that air bubbles are caused to rise over the exterior surface of the screen in order to displace any solids which may have collected on the exterior surface of the screen and thus maintain a clean screen surface.

The screen of the present invention offers practical separation of fine solid slurries as in gold cyanidation processes from course solid particles (as in C.I.P. processing) or for any alternative processes for example uranium extraction by resin-in-pulp technology because it avoids the additional handling of the slurry including the course particles (carbon resin, etc.) and it avoids much of the attrition loss which other high rate screening processes involve. It also avoids the blocking and sanding problems which are current with simple screens and launder screens.

If desired the flow rate through the screen may be increased by the use of a small impeller located in the discharge pipe or the air lift therein.

Whilst the present invention has been described with particular reference to the screening of pulps and slurries it is equally applicable to screens used in classifying material according to maximum size rather than utilizing cyclones, hydrocyclones or other classifiers.

I claim:

1. A screening device for immersion in a vessel containing a pulp or slurry, said device comprising a screening chamber defined by a vertically extending screen closed at the top and bottom, said screen being located to be immersed in the pulp or slurry with the closed top positioned below the upper level of the pulp or slurry, an imperforate discarge pipe located within and spaced from said screen of the screening chamber and having an open lower end and positioned close to but spaced from the bottom to permit flow into said discharge pipe from within said screening chamber and an upper end extending through and sealed relative to said closed top opening into a discharge outlet external to said vessel, said discharge outlet being located below the surface level of the pulp or slurry and above the level of the bottom of the chamber, the capacity of the discharge outlet and its spacing from the bottom being such as to maintain a flow rate through the screening chamber and discharge pipe to maintain the solids in the pulp or slurry passing through the screening device in suspension.

2. A screening device as claimed at claim 1 wherein said screening chamber is a substantially cylindrical wall.

3. A screening device as claimed at claim 1 wherein the discharge pipe opens through the top of said screening chamber.

4. A screening device as claimed at claim 1 wherein clearance means is provided for causing a flow of air bubbles over the exterior of the screen.

5. A screening device as claimed at claim 4 wherein said clearance means comprises a plenum chamber at the bottom of said screening chamber, source of air connected to said plenum chamber and provided with a set of outlets located around the base of the screen.

6. A screening device as claimed at claim 1 wherein the device is adapted to be located in a weir to extend downwardly therefrom, said weir comprising said discharge outlet.

7. A screening device as claimed at claim 2 wherein the discharge pipe opens through the top of said screening chamber.

8. A screening device as claimed at claim 7 wherein clearance means is provided for causing a flow of air bubbles over the exterior of the screen.

9. A screening device as claimed at claim 2 wherein clearance means is provided for causing a flow of air bubbles over the exterior of the screen.

10. A screening device as claimed at claim 3 wherein clearance means is provided for causing a flow of air bubbles over the exterior of the screen.

11. A screening device as claimed at claim 2 wherein the device is adapted to be located in a weir to extend downwardly therefrom, said weir comprising said discharge outlet.

12. A screening device as claimed at claim 3 wherein the device is adapted to be located in a weir to extend downwardly therefrom, said weir comprising said discharge outlet.

13. A screening device as claimed at claim 4 wherein the device is adapted to be located in a weir to extend downwardly therefrom, said weir comprising said discharge outlet.

14. A screening device as claimed at claim 5 wherein the device is adapted to be located in a weir to extend downwardly therefrom, said weir comprising said discharge outlet.

15. A screening device as claimed at claim 7 wherein the device is adapted to be located in a weir to extend downwardly therefrom, said weir comprising said discharge outlet.

16. A screening device as claimed at claim 8 wherein the device is adapted to be located in a weir to extend downwardly therefrom, said weir comprising said discharge outlet.

17. A screening device as claimed at claim 9 wherein the device is adapted to be located in a weir to extend downwardly therefrom, said weir comprising said discharge outlet.

18. A screening device as claimed at claim 10 wherein the device is adapted to be located in a weir to extend downwardly therefrom, said weir comprising said discharge outlet.

* * * * *